(12) United States Patent
Takee et al.

(10) Patent No.: US 6,919,812 B2
(45) Date of Patent: Jul. 19, 2005

(54) KEY LOCK-IN PREVENTION SYSTEM

(75) Inventors: Akira Takee, Kobe (JP); Minoru Yoshimura, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/237,625

(22) Filed: Sep. 10, 2002

(65) Prior Publication Data

US 2003/0048180 A1 Mar. 13, 2003

(30) Foreign Application Priority Data

Sep. 11, 2001 (JP) ........................................ 2001-275219

(51) Int. Cl.$^7$ .............................................. G08B 21/00
(52) U.S. Cl. ................. 340/686.1; 340/438; 340/425.5; 340/426; 340/457
(58) Field of Search .............................. 340/686.1, 438, 340/425.5, 426, 457; 70/263, 237, 413; 307/9.1, 10.2, 10.3, 10.6

(56) References Cited

U.S. PATENT DOCUMENTS 5,461,360 A * 10/1995 Guim et al. ................. 340/457
5,633,625 A * 5/1997 Gaub et al. .................. 340/438
5,659,291 A * 8/1997 Kennedy et al. ............ 340/457

FOREIGN PATENT DOCUMENTS

| JP | 05-155312 | 6/1993 |
| JP | 06-171467 | 6/1994 |
| JP | 09-249094 | 9/1997 |

* cited by examiner

*Primary Examiner*—Jeffery Hofsass
*Assistant Examiner*—Hung Nguyen
(74) *Attorney, Agent, or Firm*—Wenderoth, Lind & Ponack, L.L.P.

(57) ABSTRACT

A key lock-in prevention system has a warning of a failure to remove a key properly given to a driver when the driver has forgotten to remove the ignition key. When such warning is not required, it is possible to give no warning, wherein no warning of a failure to remove a key is given to the driver when the ignition key is inserted into the key cylinder during the driver's seat side door's open state, even if three conditions, that is, the ignition key is inserted in the key cylinder (Condition 1), the driver's seat side door is open (Condition 2) and the ignition switch is in the off state (Condition 3) are met at the same time.

10 Claims, 11 Drawing Sheets

KEY LOCK-IN PREVENTION SYSTEM

BACKGROUND OF THE INVENTION

1. Field of the Invention

The present invention relates to a key lock-in prevention system and, more particularly, to a key lock-in prevention system for preventing an ignition key from being locked in a car after the driver gets out of the car with the key in a state of inserted in a key cylinder.

2. Description of the Relevant Art

Hitherto, there have been systems for preventing an ignition key from being locked in a car after the driver gets out of the car with the key inserted in a key cylinder. For example, systems have been known whereby a warning sound is generated for announcing a failure to remove an ignition key to the driver when the conditions for generating the warning sound are regarded as being met, that is, when a condition that the ignition key is in a state of inserted in the key cylinder (Condition 1), a condition that the driver's seat side door is open (Condition 2) and a condition that an ignition switch is in the off state (Condition 3), these three conditions being satisfied at the same time (e.g. Japanese Kokai 06-171467 and Japanese Kokai 09-249094).

By the way, when a driver starts an engine, usually, the driver opens the driver's seat side door to get onto the driver's seat, closes the door and inserts an ignition key into a key cylinder so as to turn the ignition key.

However, in summertime, since the temperature inside a car becomes extremely high, there are instances where a driver inserts an ignition key into a key cylinder and turns the ignition key so as to start an engine without closing the door. If such actions are tried, the above-described Conditions 1–3 are satisfied simultaneously at a point of time when the ignition key is inserted into the key cylinder, so that a warning sound is generated in a conventional key lock-in prevention system, resulting in an unpleasant feeling being given to the driver.

SUMMARY OF THE INVENTION

The present invention was accomplished in order to solve the above problem, and it is an object of the present invention to provide a key lock-in prevention system whereby a warning of a failure to remove a key can be properly given to a driver when the driver has forgotten to remove the ignition key, while it is possible to give no warning when such warning is not necessary.

According to an examination of the phenomenon of a failure to remove an ignition key, such failure to remove an ignition key usually results from the driver's opening the driver's seat side door to get out of the car with the ignition key inserted in the key cylinder and shutting the door.

In cases where the ignition key is inserted in the key cylinder, when the door in the closed state is changed into the open state, there is a possibility that a failure to remove an ignition key may be caused.

On the other hand, it can be said that cases where the ignition key is not inserted in the key cylinder when the door in the closed state is changed into the open state are either a normal getting out of case where the driver opens the door to get out of the car after removing the ignition key from the key cylinder, or a case where the driver opens the door to get into the car (in this case, the ignition key is not inserted in the key cylinder, as a matter of course).

And it can be said that a case where the ignition key is not inserted in the key cylinder when the door in the closed state is changed into the open state, but then the ignition key is inserted into the key cylinder while the door is kept in the open state, is the case where the driver opens the door for getting into the car and tries to start an engine with the door kept open.

Needless to say, a case where the driver removed the ignition key from the key cylinder and opened the door in order to get out of the car, but on second thought, with the door kept open, the driver inserts the ignition key into the key cylinder to start the engine again, can be also imagined exceptionally. However, in any of these cases, since the driver does not have an intention of getting out of the car with the ignition key in the key cylinder, the warning of a failure to remove a key is from the first unnecessary.

By the way, using a conventional system for preventing a failure to remove a key, Conditions 1–3 described in the "Description of the Relevant Art" are simply detected separately, and when these three conditions are satisfied at the same time, a warning sound is generated. However, as described above, the present inventors found a new knowledge that whether the case is a failure to remove a key or not can be discerned by detecting both the timing when Condition 1 (an ignition key is in a state of insertion in a key cylinder) is met, and the timing when Condition 2 (the driver's seat side. door is open) is met.

The present invention was achieved based on such knowledge, and a key lock-in prevention system (1) according to the present invention is characterized by being a key lock-in prevention system having a warning means to give a warning of a failure to remove a key to a driver on condition that at least predetermined conditions are met. The predetermined conditions include an ignition key being in a state of insertion in a key cylinder and the driver's seat side door being open. A first judging means judges whether or not the ignition key is inserted into the key cylinder while the driver's seat side door is in the open state on the basis of a signal detected by a key position detecting means to detect whether or not the ignition key is in a state of insertion in the key cylinder and a signal detected by a door open/closed state detecting means to detect the open/closed state of the door. The warning means does not give the warning of a failure to remove a key even if the predetermined conditions are met when the first judging means judges the ignition key to have been inserted into the key cylinder during the door's open state.

Using the above key lock-in prevention system (1), the predetermined conditions include a condition that the ignition key is in the state of insertion in the key cylinder and a condition that the driver's seat side door is open. For example, when the predetermined conditions are the three conditions described in the "Description of the Relevant Art" and the warning of a failure to remove a key is given on condition that these three conditions are satisfied, it is possible to properly give the warning of a failure to remove a key to the driver.

When the ignition key was inserted into the key cylinder while the driver's seat side door has been in the open state, it can be judged that the driver is trying to start an engine with the door kept open, so that no warning of a failure to remove a key is given, even if the predetermined conditions (for example, the three conditions described in the "Description of the Relevant Art") have been satisfied. Therefore, even if the driver inserts the ignition key into the key cylinder in order to start an engine without closing the door because of the extremely high temperature inside the car, for example, the warning is not given.

Therefore, when the driver has forgotten to remove the ignition key, it is possible to properly give the warning of a failure to remove a key to the driver, while it is possible to give no warning when such warning is not necessary.

A key lock-in prevention system (2) according to the present invention is characterized by the warning of a failure to remove a key, being given at a first volume level, wherein the warning means gives a warning at a second volume level lower than the first volume level, when the first judging means judges the ignition key to have been inserted into the key cylinder during the door's open state and the predetermined conditions are also met in the above key lock-in prevention system (1).

Using the above key lock-in prevention system (1), when the ignition key was inserted into the key cylinder while the driver's seat side door has been in the open state, the driver is regarded as having inserted the ignition key into the key cylinder in order to start an engine without closing the door because of the extremely high temperature inside the car, for example, so that no warning of a failure to remove a key is given, even if the predetermined conditions (for example, the three conditions described in the "Description of the Relevant Art") have been satisfied.

However, even when the ignition key is inserted into the key cylinder while the driver's seat side door is in the open state, it can be thought that an event of key lock-in may be caused for some reason.

Using the above key lock-in prevention system (2), when the ignition key is inserted into the key cylinder while the door is in the open state, and the predetermined conditions are met, not a normal warning of a failure to remove a key (a warning at a first volume level), but a warning at a second volume level lower than the first volume level is given.

Even when it can be judged that the driver is trying to start an engine with the door kept open, such warning of a failure to remove a key is given if there are just a few possibilities of an event of key lock-in, resulting in prevention of the occurrence of the event. And since the warning in the above case is given at a volume level lower than the normal warning of a failure to remove a key, it is possible to invite the driver's attention to his/her failure to remove a key without giving an unpleasant feeling to the driver.

A key lock-in prevention system (3) according to the present invention is characterized by comprising a second judging means to judge whether the ignition key is turned or not before an elapse of a prescribed time after the first judging means judges the ignition key to have been inserted into the key cylinder during the door's open state, on the basis of a signal detected by an ignition key turning detecting means. The warning means gives a warning of a failure to remove a key when the second judging means judges the ignition key not to have been turned before an elapse of the prescribed time in the above key lock-in prevention system (1).

A key lock-in prevention system (4) according to the present invention is characterized by the warning of a failure to remove a key, being given at a first volume level, wherein the warning means gives a warning at a second volume level lower than the first volume level until the prescribed time elapses or the ignition key is turned, when the first judging means judges the ignition key to have been inserted into the key cylinder during the door's open state and the predetermined conditions are also met in the above key lock-in prevention system (3).

Usually, when the engine is started with the driver's seat side door in the open state, the ignition key is to be turned as soon as the ignition key is inserted into the key cylinder. In other words, in a case where the ignition key is not turned though the ignition key is inserted in the key cylinder, it is thought that the driver might have lost his/her intention of starting an engine. In this case, there is a possibility of the occurrence of key lock-in.

Using the above key lock-in prevention system (3) or (4), when the ignition key is not turned before an elapse of the prescribed time (for example, 2 seconds) after the ignition key is inserted into the key cylinder while the driver's seat side door is in the open state, the warning of a failure to remove a key is given, resulting in prevention of the occurrence of such event.

Moreover, using the above key lock-in prevention system (4), until the prescribed time elapses or the ignition key is turned after the ignition key is inserted into the key cylinder while the driver's seat side door is in the open state, not a normal warning of a failure to remove a key (a warning at a first volume level) but a warning at a second volume level lower than the first volume level is given.

Even when it can be judged that the driver is trying to start an engine with the door kept open, such warning of a failure to remove a key is given if there are just a few possibilities of an event of key lock-in, resulting in prevention of the occurrence of the event. And since the warning in the above case is given at a volume level lower than the normal warning of a failure to remove a key, it is possible to invite the driver's attention to his/her failure to remove a key without giving an unpleasant feeling to the driver.

A key lock-in prevention system (5) according to the present invention is characterized by being a key lock-in prevention system having a warning means to give a warning of a failure to remove a key to a driver on condition that at least predetermined conditions are met. The predetermined conditions include an ignition key being in a state of insertion in a key cylinder and the driver's seat side door being open. A third judging means judges whether or not the driver's seat side door is opened while the ignition key is inserted in-the key cylinder, on the basis of a signal detected by a key position detecting means to detect whether or not the ignition key is in a state of inserted in the key cylinder and a signal detected by a door open/closed state detecting means to detect the open/closed state of the door. The predetermined conditions include a condition that the third judging means judges the door to have been opened during the ignition key's state of insertion in the key cylinder.

It appears that a typical case where an event of a failure to remove a key occurs is the case where the driver opens the driver's seat side door with the ignition key kept in a state of inserted in the key cylinder, gets out of the car with the key left as it is, and shuts the door.

Using the above key lock-in prevention system (5), since a requirement constituting the above case, that the door is opened while the ignition key is inserted in the key cylinder, is included in the predetermined conditions, it is possible to properly give a warning of a failure to remove a key to the driver when the driver has forgotten to remove the ignition key. On the other hand, when such warning is not required, it is possible to give no warning.

A key lock-in prevention system (6) according to the present invention is characterized by being a key lock-in prevention system having a warning means to give a warning of a failure to remove a key to a driver on condition that at least predetermined conditions are met, the predetermined conditions including an ignition key being in a state of insertion in a key cylinder and the driver's seat side door being open. A fourth judging means judges whether or not a prescribed time elapses after the predetermined conditions are met, wherein the warning means gives a warning of a failure to remove a key when the fourth judging means judges the prescribed time to have elapsed.

A key lock-in prevention system (7) according to the present invention is characterized by the warning of a failure to remove a key being given at a first volume level, wherein the warning means gives a warning at a second volume level lower than the first volume level until an elapse of the prescribed time after the predetermined conditions are met in the above key lock-in prevention system (6).

As described in the "Description of the Relevant Art", there has been a problem that a warning sound is generated when no warning is required. For example, when a driver tries to start an engine without closing the driver's seat side door, a warning sound is generated at a point of time when an ignition key is inserted into a key cylinder, leading to an unpleasant feeling given to the driver.

Using the above key lock-in prevention system (6) or (7), a delay time (e.g. 2 seconds) is set before the warning of a failure to remove a key is given after the predetermined conditions are satisfied. Therefore, when the driver tries to start an engine without closing the driver's seat side door, it is possible to prevent the warning sound from being generated by making the other conditions (for example, an ignition switch being is in the off state) unsatisfied within the delay time.

Moreover, even when an actual failure to remove a key is about to occur, the warning sound is generated before the door is closed, so that it is possible to let the driver notice his/her failure to remove the key, since the driver can hardly get out of the car and close the door within the delay time.

Therefore, when the driver has forgotten to remove the ignition key, a warning of a failure to remove a key can be properly given to the driver, while when such warning is not required, it is possible to give no warning.

Furthermore, using the above key lock-in prevention system (7), since not a normal warning of a failure to remove a key (a warning at a first volume level) but a warning at a second volume level lower than the first volume level is given during the delay time, it is possible to prevent a failure to remove a key with more reliability. And the warning during the delay time is given at a volume level lower than the normal warning of a failure to remove a key, so it is possible to invite the driver's attention to his/her failure to remove a key without giving an unpleasant feeling to the driver.

A key lock-in prevention system (8) according to the present invention is characterized by being a key lock-in prevention system having a warning means to give a warning of a failure to remove a key to a driver on condition that at least predetermined conditions are met, the predetermined conditions including an ignition key being in a state of insertion in a key cylinder and the driver's seat side door being open. A first judging means judges whether or not the ignition key is inserted into the key cylinder while the driver's seat side door is in the open state on the basis of a signal detected by a key position detecting means to detect whether or not the ignition key is in a state of insertion in the key cylinder and a signal detected by a door open/closed state detecting means to detect the open/closed state of the door. A fifth judging means judges whether or not a first prescribed time elapses after the first judging means judges the ignition key to have been inserted into the key cylinder during the door's open state. The warning means gives a warning of a failure to remove a key when the fifth judging means judges the first prescribed time to have elapsed after the ignition key was inserted into the key cylinder during the door's open state.

It is thought that a case where the ignition key is inserted into the key cylinder while the driver's seat side door is in the open state may be, for example, the case where the driver tries to start an engine without closing the door because of the extremely high temperature inside the car. Therefore, it appears that the warning of a failure to remove a key need not be given.

However, even when the ignition key is inserted into the key cylinder while the driver's seat side door is in the open state, it is thought that there is a possibility of the occurrence of an event of key lock-in for some reason, though it is slight.

Using the above key lock-in prevention system (8), when the predetermined conditions have been satisfied until the first prescribed time (e.g. 2 seconds) elapses after the ignition key was inserted into the key cylinder during the driver's seat side door's open state, the warning of a failure to remove a key is given, so that it is possible to prevent the event from occurring.

A key lock-in prevention system (9) according to the present invention is characterized by comprising a third judging means to judge whether or not the driver's seat side door is opened while the ignition key is inserted in the key cylinder on the basis of a signal detected by a key position detecting means to detect whether or not the ignition key is in a state of insertion in the key cylinder and a signal detected by a door open/closed state detecting means to detect the open/closed state of the door. A sixth judging means judges whether or not a second prescribed time elapses after the third judging means judges the door to have been opened during the ignition key's state of insertion in the key cylinder. The warning means gives a warning of a failure to remove a key when the sixth judging means judges the second prescribed time to have elapsed after the door was opened during the ignition key's state of insertion in the key cylinder. The second prescribed time is set to be shorter than the first prescribed time in the above key lock-in prevention system (8).

It appears that a typical case where an event of a failure to remove a key occurs is the case where the driver opens the driver's seat side door with the ignition key kept inserted in the key cylinder, gets out of the car with the key left as it is, and shuts the door.

Using the above key lock-in prevention system (9), when the predetermined conditions have been satisfied until the second prescribed time (e.g. 0.1 second) elapses after the door was opened while the ignition key has been inserted in the key cylinder, the warning of a failure to remove a key is given.

Furthermore, since the second prescribed time is set to be shorter than the first prescribed time, the warning of a failure to remove a key can be properly given to the driver when the driver has forgotten to remove the ignition key, while when the warning is not required, it is possible to give no warning. Here, the second prescribed time may be 0 seconds.

A key lock-in prevention system (10) according to the present invention is characterized by being a key lock-in prevention system having a warning means to give a warning of a failure to remove a key to a driver on condition that at least predetermined conditions are met, the predetermined conditions including an ignition key being in a state of insertion in a key cylinder and the driver's seat side door being open. A seventh judging means judges whether or not occupants are within the car, or an occupant is on the driver's seat, on the basis of a signal detected by an occupant detecting means to detect the existence of occupants within the car or an occupant on the driver's seat. The predetermined conditions include a condition that no occupant is within the car or on the driver's seat.

When there is an occupant within the car, especially an occupant (a driver) on the driver's seat, no particular problem is caused even if the driver's seat side door is closed with the ignition key kept inserted in the key cylinder.

Using the above key lock-in prevention system (10), since a condition that no occupant is within the car or on the driver's seat is included in the predetermined conditions, a more excellent key lock-in prevention system can be realized.

DESCRIPTION OF THE PREFFERRED EMBODIMENTS

Figure 1:
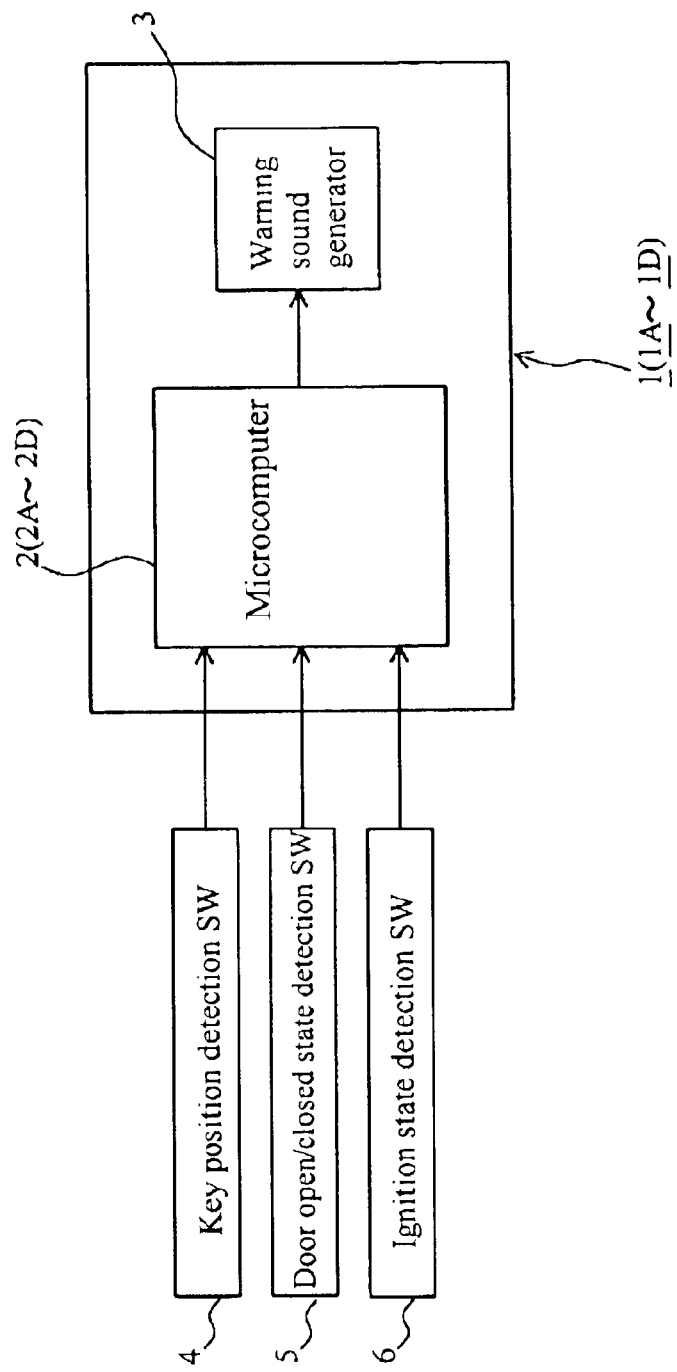
FIG. 1 is a block diagram schematically showing a principal part of a key lock-in prevention system according to an embodiment (1) of the present invention.

The preferred embodiments of the key lock-in prevention system according to the present invention are described below by reference to the drawings. FIG. 1 is a block diagram schematically showing the principal part of a key lock-in prevention system according to an embodiment (1). Reference numeral 1 in the figure represents a key lock-in prevention system, comprising a microcomputer 2 and a warning sound generator 3 which generates a warning sound.

To the microcomputer 2, a key position detection switch 4 to detect whether or not an ignition key is in a state of insertion in a key cylinder, a door open/closed state detection switch 5 to detect the open/closed state of the driver's seat side door, and an ignition state detection switch 6 to detect the on/off state of an ignition switch are connected.

Here, the on state of the ignition switch is a case where the ignition key is in the ON position or ACC position, while the off state thereof is a case where the ignition key is in the OFF position. However, in another preferred embodiment, the on state of the ignition switch may be a case where the ignition key is in the ON position, while the off state thereof may be a case where the ignition key is in the OFF position or ACC position.

Figure 2:
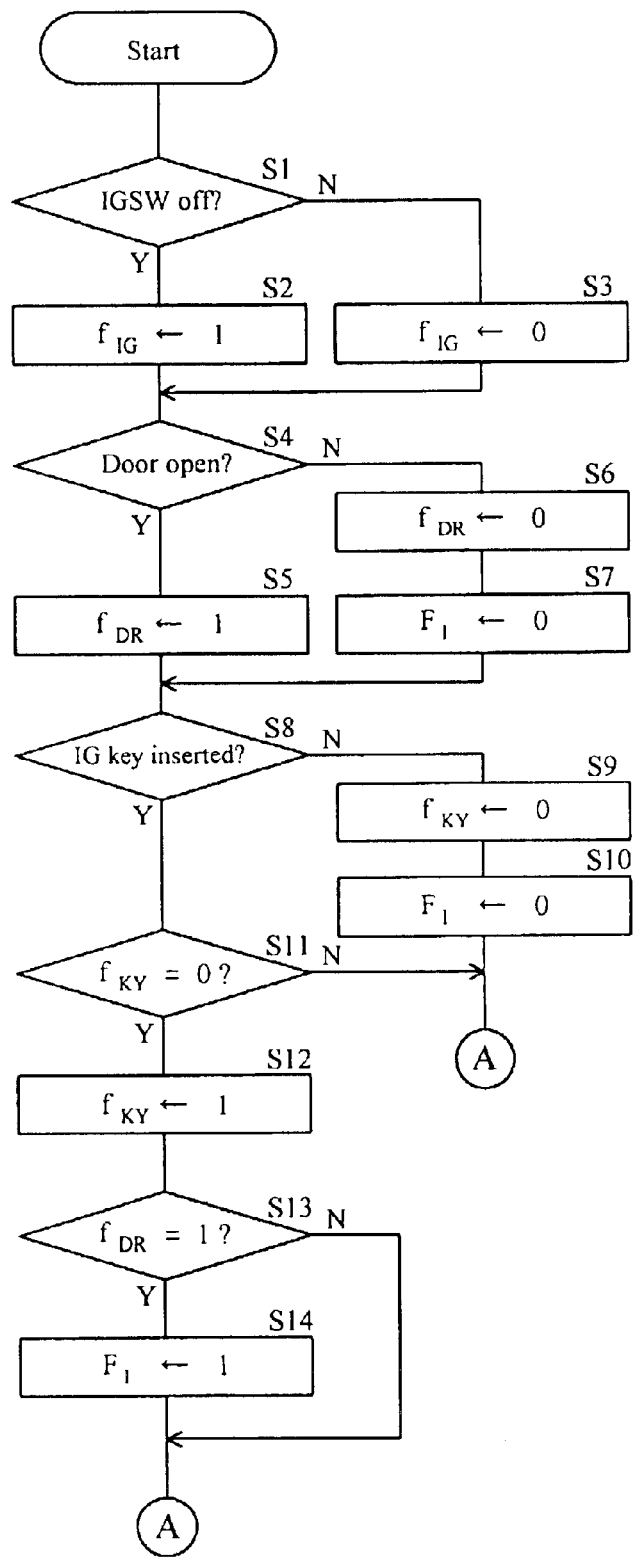
FIG. 2 is a flow chart showing a processing operation performed by a microcomputer in the key lock-in prevention system according to the embodiment (1)

A processing operation ① performed by the microcomputer 2 in the key lock-in prevention system 1 according to the embodiment (1) is described by reference to flow charts shown in FIGS. 2 and 3. First, whether the ignition switch is in the off state or not is judged based on a signal from the ignition state detection switch 6 (Step 1). When the ignition switch is judged to be in the off state, a flag $f_{IG}$ is changed to 1 (Step 2), while when the ignition switch is judged not to be in the off state, the flag $f_{IG}$ is changed to 0 (Step 3).

Then, whether the driver's seat side door is open or not is judged based on a signal from the door open/closed state detection switch 5 (Step 4). When the door is judged to be open, a flag $f_{DR}$ is changed to 1 (Step 5) and the operation proceeds to Step 8. On the other hand, when the door is judged not to be open (or to be closed), the flag $f_{DR}$ is changed to 0 (Step 6) and a flag $F_1$ is changed to 0 (Step 7), and it proceeds to Step 8. Here, flag $F_1$ is a flag showing that the ignition key was inserted into the key cylinder while the door has been in the open state.

In Step 8, whether the ignition key is inserted in the key cylinder or not is judged based on a signal from the key position detection switch 4. When the ignition key is judged to be inserted in the key cylinder, whether a flag $f_{Ky}$, showing that the ignition key is inserted in the key cylinder is 0 or not is judged (Step 11). When the flag $f_{KY}$ is judged to be 0, the flag $f_{KY}$ is changed to 1 (Step 12), and then the operation goes to Step 13.

Figure 3:
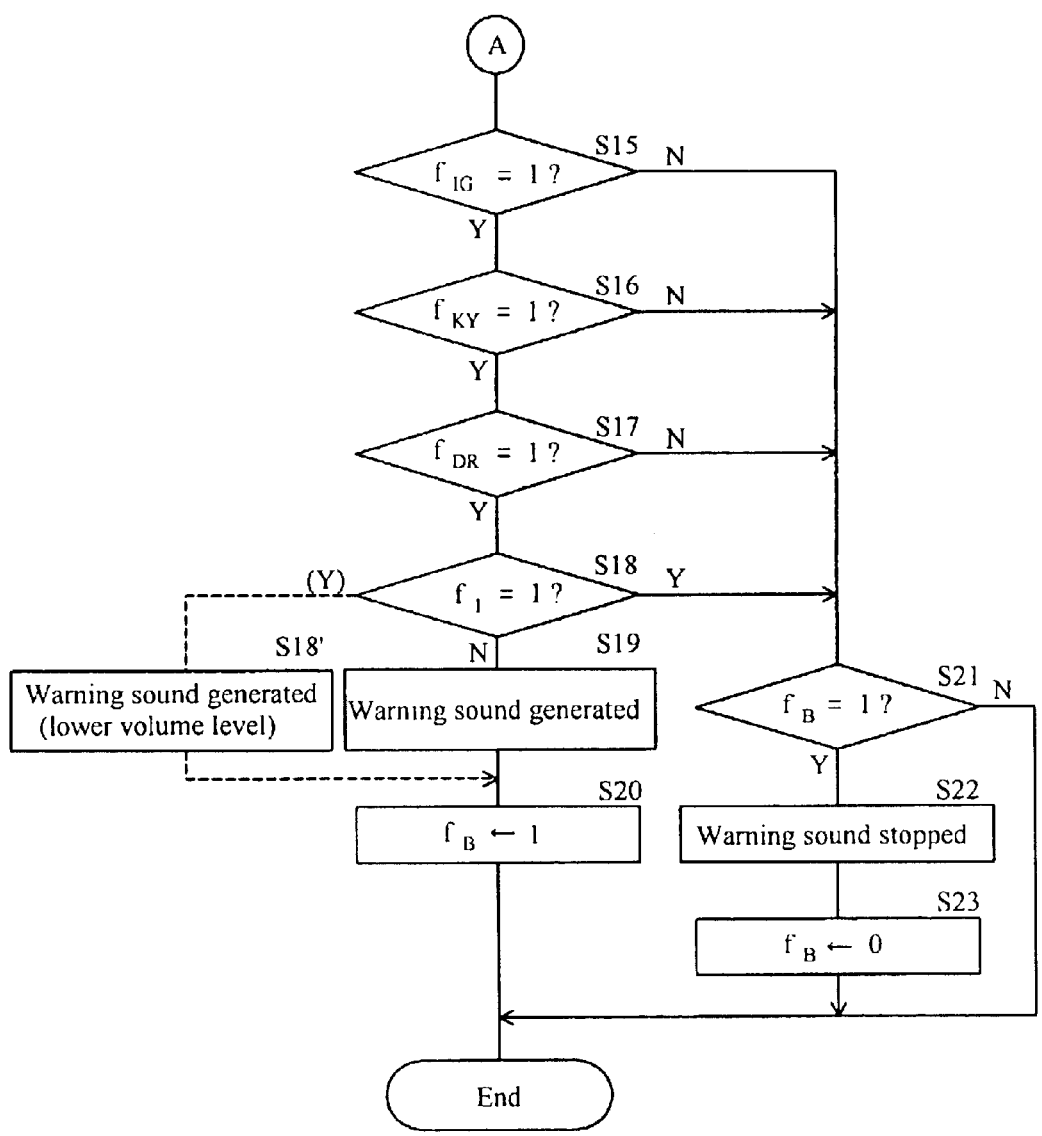
FIG. 3 is a further flow chart showing the processing operation performed by the microcomputer in the key lock-in prevention system according to the embodiment (1)

On the other hand, when the ignition key is judged not to be inserted in the key cylinder in Step 8, the flag $f_{KY}$ is changed to 0 (Step 9) and the flag $F_1$ is changed to 0 (Step 10), and then it goes to Step 15 (FIG. 3).

By the way, the judgment processing in Step 11 is conducted in a case where the ignition key is inserted in the key cylinder. Therefore, that the flag $f_{KY}$ is judged to be 0 in Step 11 means that the ignition key has been just inserted into the key cylinder.

In Step 13, whether the flag $f_{DR}$ is 1 or not is judged. When it is judged that the flag $f_{DR}$ is 1 (the driver's seat side door is in the open state), that is, the driver's seat side door had been open at a point of time when the ignition key was inserted into the key cylinder, in other words, the ignition key was inserted into the key cylinder after the door was opened, the flag $F_1$ is changed to 1 (Step 14), and then the operation goes to Step 15 (FIG. 3). On the other hand, when the flag $f_{DR}$ is judged not to be 1, it goes direct to Step I5.

In Step 15, whether the flag $f_{IG}$ is 1 or not is judged. When the flag $f_{IG}$ is judged to be 1 (the ignition switch is in the off state), whether the flag $f_{KY}$ is 1 or not is judged (Step 16). When the flag $f_{KY}$ is judged to be 1 (the ignition key is inserted in the key cylinder), whether the flag $f_{DR}$ is 1 or not is judged (Step 17). When the flag $f_{DR}$ is judged to be 1 (the driver's seat side door is open); whether the flag $F_1$ is 1 or not is judged (Step 18).

When the flag $F_1$ is judged not to be 1 (the ignition key was not inserted into the key cylinder while the door has been open) in Step 18, the warning sound generator 3 is controlled so as to generate a warning sound (Step 19), and then a flag $f_B$ showing that the warning sound is being generated is changed to 1 (Step 20).

On the other hand, when the flag $F_1$ is judged to be 1 (the ignition key was inserted into the key cylinder while the door has been open), the warning sound need not be generated, so that the operation goes not to Step 19 but to Step 21.

In addition, when the flag $f_{IG}$ is judged to be 0 (the ignition switch is in the on state) in Step 15, or the flag $f_{KY}$ is judged to be 0 (the ignition key is not inserted in the key cylinder) in Step 16, or the flag $f_{DR}$ is judged to be 0 (the driver's seat side door is closed) in Step 17, the prevention of key lock-in is not required, so that the operation goes to Step 21.

In Step 21, whether the flag $f_B$ showing that the warning sound is being generated is 1 or not is judged. When the flag $f_B$ is judged to be 1, the warning sound generator 3 is controlled so as to stop the warning sound (Step 22), and then the flag $f_B$ is changed to 0 (Step 23). On the other hand, when the flag $f_B$ is judged not to be 1, the processing operation ① is ended at once.

Using the key lock-in prevention system according to the embodiment (1), since a warning sound is generated on condition that these three conditions, that is, the ignition switch is in the off state, the ignition key is in a state of inserted in the key cylinder and the driver's seat side door is open, are satisfied, it is possible to properly give a warning of a failure to remove a key to the driver.

Moreover, no warning sound is generated even if the above three conditions have been satisfied, when the ignition key was inserted into the key cylinder while the driver's seat side door was in the open state. Therefore, no warning sound is generated even if the driver inserts the ignition key into the key cylinder in order to start an engine without closing the door because of the extremely high temperature inside the car, for example.

Therefore, when the driver has forgotten to remove the ignition key, it is possible to properly give a warning of a failure to remove a key to the driver, while when the warning is not required, it is possible to give no warning.

Here, in the key lock-in prevention system according to the embodiment (1), no warning sound is generated when the ignition key is inserted into the key cylinder while the door is in the open state, but in a key lock-in prevention system according to another embodiment, a warning sound may be generated at a lower volume than the normal warning sound of a failure to remove a key. In this case, when the flag $F_1$ is judged to be 1 in Step 18 of FIG. 3, the operation proceeds not to Step 21 but to Step 18', wherein a warning sound of a lower volume is generated, and then it goes to Step 20.

Through this operation, by generating a warning sound at a lower volume level even in a case where no warning is originally required (but it cannot be said that there is no possibility of key lock-in), such as a case where an ignition key is inserted into a key cylinder with the door in the open state, the prevention of key lock-in can be conducted with more reliability. Moreover, the warning in the above case is given at a lower volume level than the normal warning of a failure to remove a key, so that it is possible to invite the driver's attention to his/her failure to remove a key without giving an unpleasant feeling to the driver.

A key lock-in prevention system according to an embodiment (2) is described below. Here, since the construction of the key lock-in prevention system according to the embodiment (2) is similar to that of the key lock-in prevention system 1 shown in FIG. 1 except for the microcomputer 2, only a microcomputer and a key lock-in prevention system comprising the microcomputer are differently marked and the others are not described below.

Figure 4:
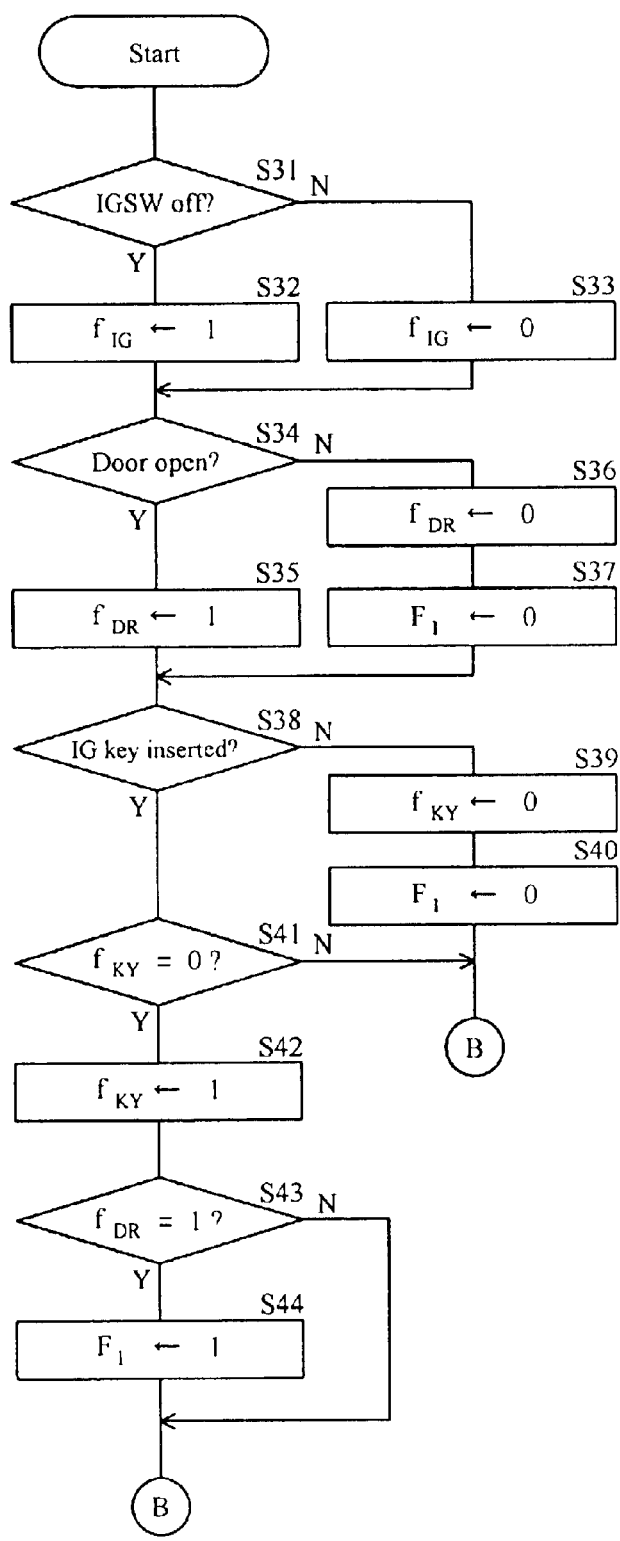
FIG. 4 is a flow chart showing a processing operation performed by a microcomputer in a key lock-in prevention system according to an embodiment (2)

The processing operation ② performed by the microcomputer 2A in the key lock-in prevention system 1A according to the embodiment (2) is described by reference to flow charts shown in FIGS. 4 and 5. First, whether an ignition switch is in the off state or not is judged based on a signal from an ignition state detection switch 6 (Step 31). When the ignition switch is judged to be in the off state, a flag $f_{IG}$ is changed to 1 (Step 32), while when the ignition switch is judged not to be in the off state, the flag $f_{IG}$ is changed to 0 (Step 33).

Then, whether the driver's seat side door is open or not is judged based on a signal from a door open/closed state detection switch 5 (Step 34). When the door is judged to be open, a flag $f_{DR}$ is changed to 1 (Step 35) and the operation proceeds to Step 38. On the other hand, when the door is judged not to be open, the flag $f_{DR}$ is changed to 0 (Step 36) and a flag $F_1$ is changed to 0 (Step 37), and it proceeds to Step 38. Here, the flag $F_1$ is a flag showing that the ignition key was inserted into a key cylinder while the door has been in the open state.

In Step 38, whether the ignition key is inserted in the key cylinder or not is judged based on a signal from a key position detection switch 4. When the ignition key is judged to be inserted in the key cylinder, whether a flag $f_{KY}$ showing that the ignition key is inserted in the key cylinder is 0 or not is judged (Step 41). When the flag $f_{KY}$ is judged to be 0, the flag $f_{KY}$ is changed to 1 (Step 42), and then the operation goes to Step 43.

Figure 5:
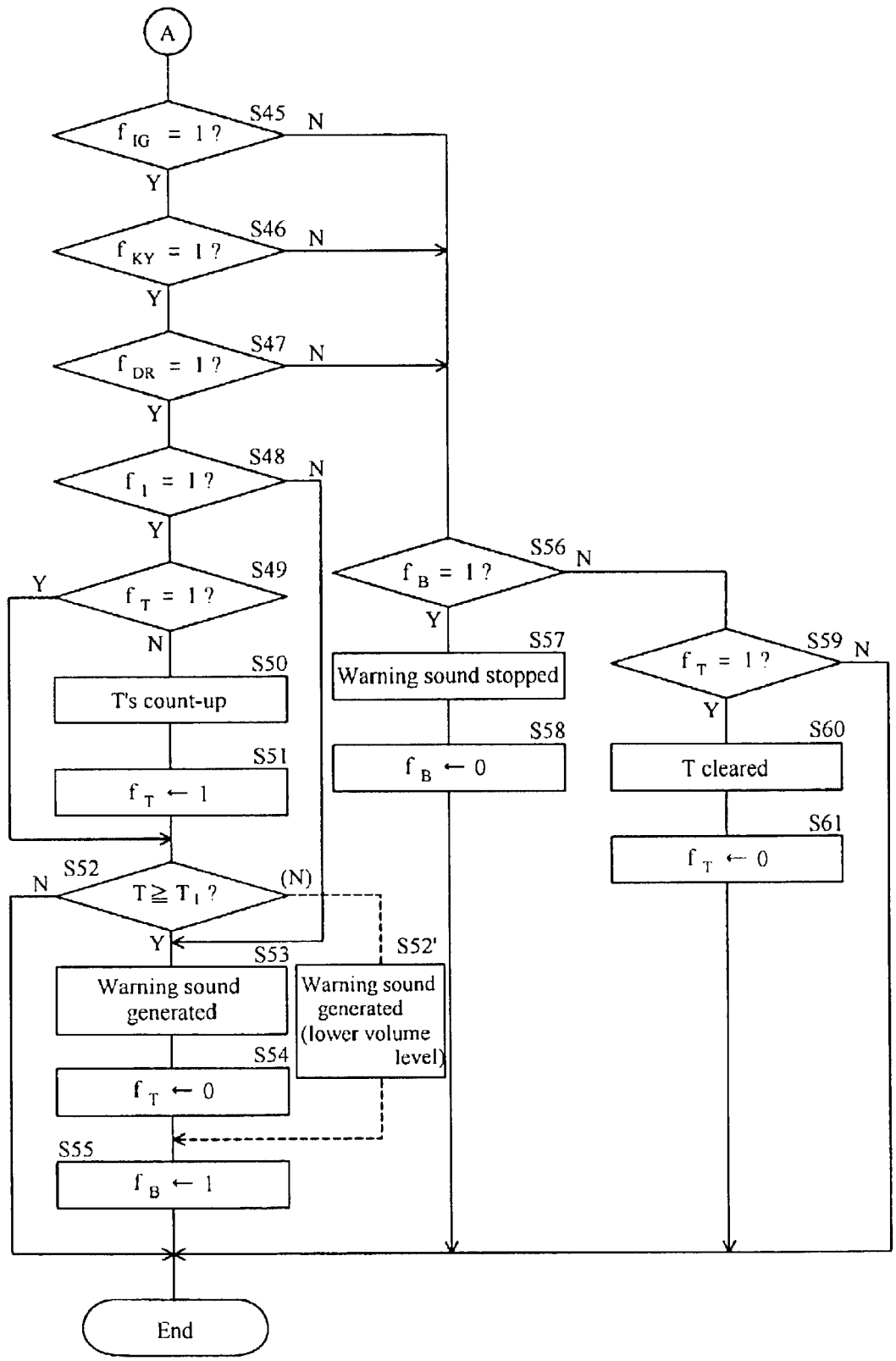
FIG. 5 is a further flow chart showing the processing operation performed by the microcomputer in the key lock-in prevention system according to the embodiment

On the other hand, when the ignition key is judged not to be inserted in the key cylinder in Step 38, the flag $f_{KY}$ is changed to 0 (Step 39) and the flag $F_1$ is changed to 0 (Step 40), and then it goes to Step 45 (FIG. 5).

By the way, the judgment processing in Step 41 is conducted in a case where the ignition key is inserted in the key cylinder. Therefore, that the flag $f_{KY}$ is judged to be 0 in Step 41 means that the ignition key was inserted into the key cylinder just now.

In Step 43, whether the flag $f_{DR}$ is 1 or not is judged. When it is judged that the flag $f_{DR}$ is 1 (the driver's seat side door is in the open state), that is, the driver's seat side door had been open at a point of time when the ignition key was inserted into the key cylinder, the flag $F_1$ is changed to 1 (Step 44), and then the operation goes to Step 45 (FIG. 5). On the other hand, when the flag $f_{DR}$ is judged not to be 1, it goes directly to Step 45.

In Step 45, whether the flag $f_{IG}$ is 1 or not is judged. When the flag $f_{IG}$ is judged to be 1 (the ignition switch is in the off state), whether the flag $f_{KY}$ is 1 or not is judged (Step 46). When the flag $f_{KY}$ is judged to be 1 (the ignition key is inserted in the key cylinder), whether the flag $f_{DR}$ is 1 or not is judged (Step 47). When the flag $f_{DR}$ is judged to be 1 (the driver's seat side door is open), whether the flag $F_1$ is 1 or not is judged (Step 48).

When the flag $F_1$ is judged to be 1 (the ignition key was inserted into the key cylinder while the door has been open) in Step 48, whether a flag $f_T$ is 1 or not is judged (Step 49). Here, the flag $f_T$ shows that a below-described timer T is carrying out count-up.

When the flag $f_T$ is judged not to be 1 in Step 49, the timer T is caused to start the count-up (Step 50), the flag $f_T$ is changed to 1 (Step 51), and the operation goes to Step 52. On the other hand, when the flag $f_T$ is judged to be 1 in Step 49, the timer T has already been conducting the count-up, it bypasses Steps 50 and 51, and goes direct to Step 52. Here, the count-up of the timer T is conducted in another routine (not shown).

In Step 52, whether or not the timer T is equal to or more than a time $T_1$ (e.g. 2 seconds) is judged. When the timer T is judged to be equal to or more than the time $T_1$, a warning sound generator 3 is controlled so as to generate a warning sound (Step 53), and then it goes to Step 54. Here, the reason why such delay time of 2 seconds for the warning is set is as follows.

Usually, the action of inserting an ignition key into a key cylinder while the driver's seat side door is in the open state often shows the driver's intention of starting an engine with the door in the open state. In that case, the engine should be started as soon as the ignition key is inserted into the key cylinder.

However, when no change is found for 2 seconds after the ignition key was inserted into the key cylinder, it can be considered that the driver did not have an intention of starting an engine. Therefore, there is a possibility of key lock-in in this case, so that a warning sound need be generated.

In Step 54, the flag $f_T$ is changed to 0, and then the flag $f_B$ showing that the warning sound is being generated is changed to 1 (Step 55), while when the timer T is judged not to be equal to or more than the time $T_1$, the processing operation ② is ended.

On the other hand, when the flag $F_1$, is judged not to be 1 in Step 48, the case is judged to be a usual failure to remove a key, and the operation goes to Step 53, wherein a warning sound is immediately generated.

In addition, when the flag $f_{IG}$ is judged to be 0 (the ignition switch is in the on state) in Step 45, or the flag $f_{KY}$ is judged to be 0 (the ignition key is not inserted in the key cylinder) in Step 46, or the flag $f_{DR}$ is judged to be 0 (the driver's seat side door is closed) in Step 47, the prevention of key lock-in is not required, so that the operation goes to Step 56.

In Step 56, whether the flag $f_B$ showing that the warning sound is being generated is 1 or not is judged. When the flag $f_B$ is judged to be 1, the warning sound generator 3 is controlled so as to stop the warning sound (Step 57), and then the flag $f_B$ is changed to 0 (Step 58).

And when the flag $f_B$ is judged not to be 1 in Step 56, whether the flag $f_T$ is 1 or not is judged (Step 59). When the flag $f_T$ is judged to be 1, the timer T is cleared (Step 60), and then the flag $f_T$ is changed to 0 (Step 61). On the other hand, when the flag $f_T$ is judged not to be 1, the processing operation ② is ended at once.

In the key lock-in prevention system according to the embodiment (1), when the ignition key was inserted into the key cylinder while the driver's seat side door has been in the open state, even if these three conditions, that is, the ignition switch is in the off state, the ignition key is in a state of inserted in the key cylinder and the driver's seat side door is open, have been satisfied, the driver is regarded as having inserted the ignition key into the key cylinder in order to start an engine without closing the door because of the extremely high temperature inside the car, for example, and no warning of a failure to remove a key is given.

However, even when the ignition key is inserted into the key cylinder while the drive's seat side door is in the open state, it is thought that an event of key lock-in may be caused by Using the key lock-in prevention system according to the embodiment (2), when the ignition key is not turned (the ignition switch is not made in the on state), or the ignition key is not removed from the key cylinder, or the door is not closed before an elapse of the time $T_1$ (for example, 2 seconds) after the ignition key was inserted into the key cylinder during the driver's seat side door's open state, a warning sound is generated, so that it is possible to prevent the occurrence of the event Here, in a key lock-in prevention system according to another embodiment, instead of 2-sec delay of the generation of the warning, the volume level of the warning sound may be lowered during the time. In that case, when the timer T is judged not to be equal to or more than the time T, in Step 52 of FIG. 5, the processing operation ② is not ended at once, but it goes to Step 52', wherein a warning sound of a lower volume than the warning sound generated in Step 53 is generated, and then it goes to Step 55.

A key lock-in prevention system according to an embodiment (3) is described below. Here, since the construction of the key lock-in prevention system according to the embodiment (3) is similar to that of the key lock-in prevention system 1 shown in FIG. I except for the microcomputer 2, only a microcomputer and a key lock-in prevention system comprising the microcomputer are differently marked and the others are not described below.

Figure 6:
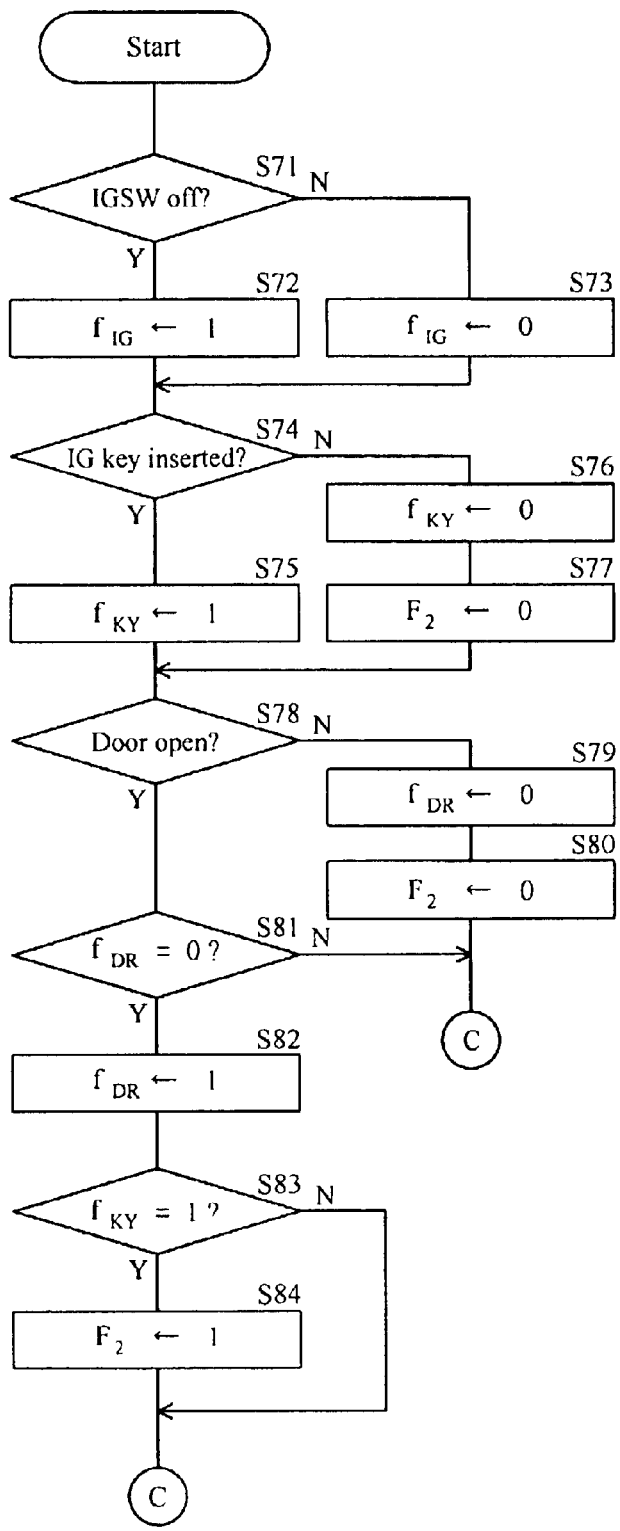
FIG. 6 is a flow chart showing a processing operation performed by a microcomputer in a key lock-in prevention system according to an embodiment (3)

The processing operation ③ performed by the microcomputer 2B in the key lock-in prevention system 1B according to the embodiment (3) is described by reference to flow charts shown in FIGS. 6 and 7. First, whether an ignition switch is in the off state or not is judged based on a signal from an ignition state detection switch 6 (Step 71). When the ignition switch is judged to be in the off state, a flag $f_{IG}$ is changed to 1 (Step 72), while when the ignition switch is judged not to be in the off state, the flag $f_{IG}$ is changed to 0 (Step 73).

Then, whether the ignition key is inserted in a key cylinder or not is judged based on a signal from a key position detection switch 4 (Step 74). When the ignition key is judged to be inserted in the key cylinder, a flag $f_{KY}$ is changed to 1 (Step 75) and the operation goes to Step 78. On the other hand, when the ignition key is judged not to be inserted in the key cylinder, the flag $f_{KY}$ is changed to 0 (Step 76) and a flag $F_2$ is changed to 0 (Step 77), and it goes to Step 78. Here, the flag $F_2$ is a flag showing that the driver's seat side door was opened while the ignition key has been inserted in the key cylinder.

In Step 78, whether the driver's seat side door is open or not is judged based on a signal from a door open/closed state detection switch 5. When the door is judged to be open, whether a flag $f_{DR}$ showing that the door is open is 0 or not is judged (Step 81). When the flag $f_{DR}$ is judged to be 0, the flag $f_{DR}$ is changed to 1 (Step 82), and then it goes to Step 83.

Figure 7:
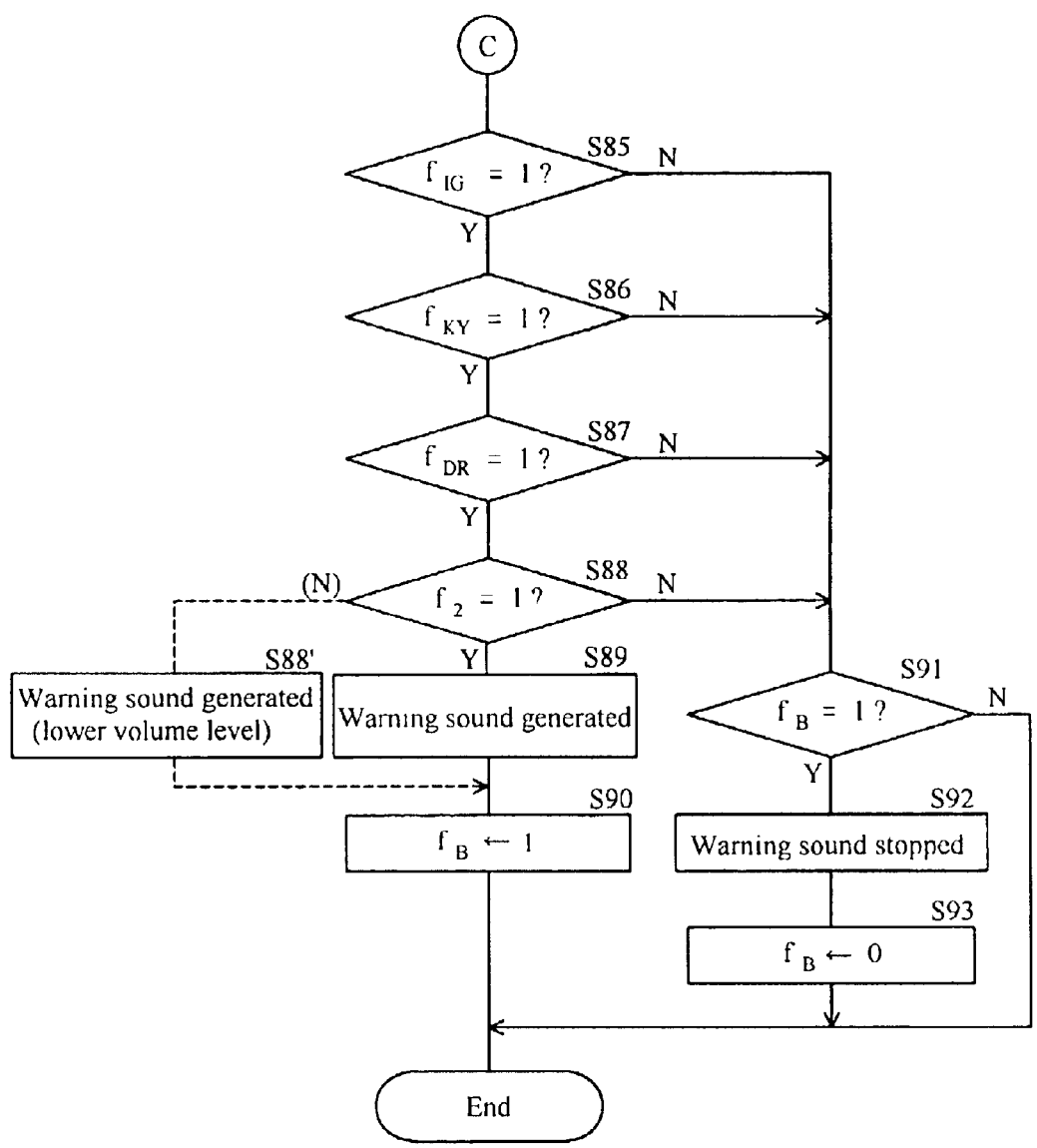
FIG. 7 is a further flow chart showing the processing operation performed by the microcomputer in the key lock-in prevention system according to the embodiment (3)

On the other hand, when the door is judged not to be open in Step 78, the flag $f_{DR}$ is changed to 0 (Step 79) and the flag $F_2$ is changed to 0 (Step 80), and then it proceeds to Step 85 (FIG. 7).

By the way, the judgment processing in Step 81 is conducted in a case where the driver's seat side door is open. Therefore, that the flag $f_{DR}$ is judged to be 0 in Step 81 means that the door in the closed state has been just changed into the open state.

In Step 83, whether the flag $f_{KY}$ is 1 or not is judged. When the flag $f_{KY}$ is judged to be 1 (the ignition key is inserted in the key cylinder), that is, the ignition key had been already inserted in the key cylinder at a point of time when the driver's seat side door was opened, the flag $F_2$ is changed to 1 (Step 84), and then the operation goes to Step 85 (FIG. 7). On the other hand, when the flag $f_{KY}$ is judged not to be 1, it goes direct to Step 85.

In Step 85, whether the flag $f_{IG}$ is 1 or not is judged. When the flag $f_{IG}$ is judged to be 1 (the ignition switch is in the off state), whether the flag $f_{KY}$ is 1 or not is judged (Step 86). When the flag $f_{KY}$ is judged to be 1 (the ignition key is inserted in the key cylinder), whether the flag $f_{DR}$ is 1 or not is judged (Step 87). When the flag $f_{DR}$ is judged to be 1 (the driver's seat side door is open), whether the flag $F_2$ is 1 or not is judged (Step 88).

In Step 88, when the flag $F_2$ is judged to be 1 (the driver's seat side door was opened while the ignition key has been inserted in the key cylinder), a warning sound generator 3 is controlled so as to generate a warning sound (Step 89), and then a flag $f_B$ showing that the warning sound is being generated is changed to 1 (Step 90).

On the other hand, that the flag $F_2$ is judged not to be 1 in Step 88 means that the ignition key had not been inserted in the key cylinder at a point of time when the door was opened, and that then the ignition key was inserted into the key cylinder with the door in the open state. Therefore, in this case, the generation of a warning sound is not required, so that the operation goes not to Step 89 but to Step 91.

In addition, when the flag $f_{IG}$ is judged to be 0 (the ignition switch is in the on state) in Step 85, or the flag $f_{KY}$ is judged to be 0 (the ignition key is not inserted in the key cylinder) in Step 86, or the flag $f_{DR}$ is judged to be 0 (the driver's seat side door is closed) in Step 87, it is not necessary to prevent key lock-in, so that it goes to Step 91.

In Step 91, whether the flag $f_B$ showing that the warning sound is being generated is 1 or not is judged. When the flag $f_B$ is judged to be 1, the warning sound generator 3 is controlled so as to stop the warning sound (Step 92), and then the flag $f_B$ is changed to 0 (Step 93). On the other hand, when the flag $f_B$ is judged not to be 1, the processing operation ③ is ended at once.

Using the key lock-in prevention system according to the embodiment (3), when the driver's seat side door is opened while the ignition key is inserted in the key cylinder, a warning sound is generated. Therefore, when the driver has forgotten to remove the ignition key, the warning of a failure to remove a key can be properly given to the driver, while when the warning is not required, it is possible to give no warning.

Here, in the key lock-in prevention system according to the embodiment (3), when the ignition key was inserted into the key cylinder with the door in the open state, no warning sound is generated. But in a key lock-in prevention system according to another embodiment, a warning sound of a lower volume than the normal warning sound of a failure to remove a key may be generated. In this case, when the flag $F_2$ is judged not to be 1 in Step 88 of FIG. 7, the operation goes not to Step 91 but to Step 88', wherein a warning sound of a lower volume is generated, and then it goes to Step 90.

The prevention of key lock-in can be made more reliable by generating a warning sound at a lower volume level even in cases where originally such warning is not required (but it cannot be said that there is no possibility of key lock-in), such as a case where the ignition key is inserted into the key cylinder with the door in the open state. In addition, since the volume level of the warning in the above case is lower than the normal warning of a failure to remove a key, it is possible to invite the driver's attention to his/her failure to remove a key without giving an unpleasant feeling to the driver.

A key lock-in prevention system according to an embodiment (4) is described below. Here, since the construction of the key lock-in prevention system according to the embodiment (4) is similar to that of the key lock-in prevention system 1 shown in FIG. 1 except for the microcomputer 2, only a microcomputer and a key lock-in prevention system comprising the microcomputer are differently marked and the others are not described below.

Figure 8:
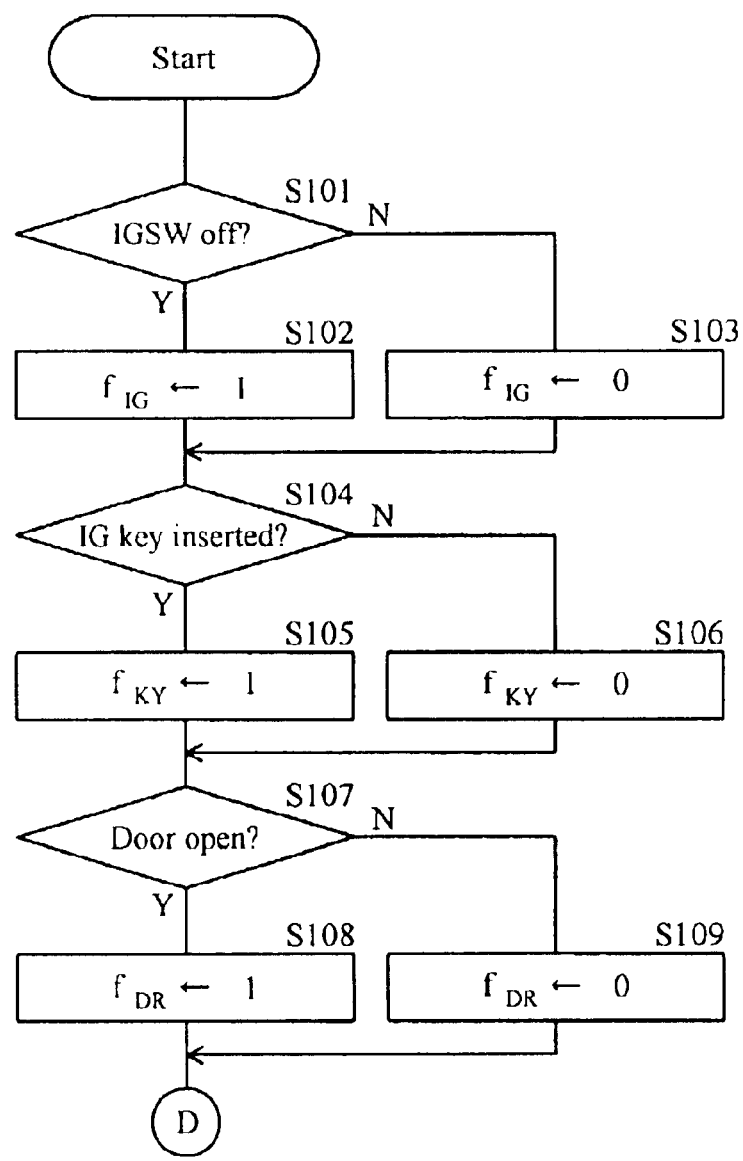
FIG. 8 is a flow chart showing a processing operation performed by a microcomputer in a key lock-in prevention system according to an embodiment (4)
Figure 9:
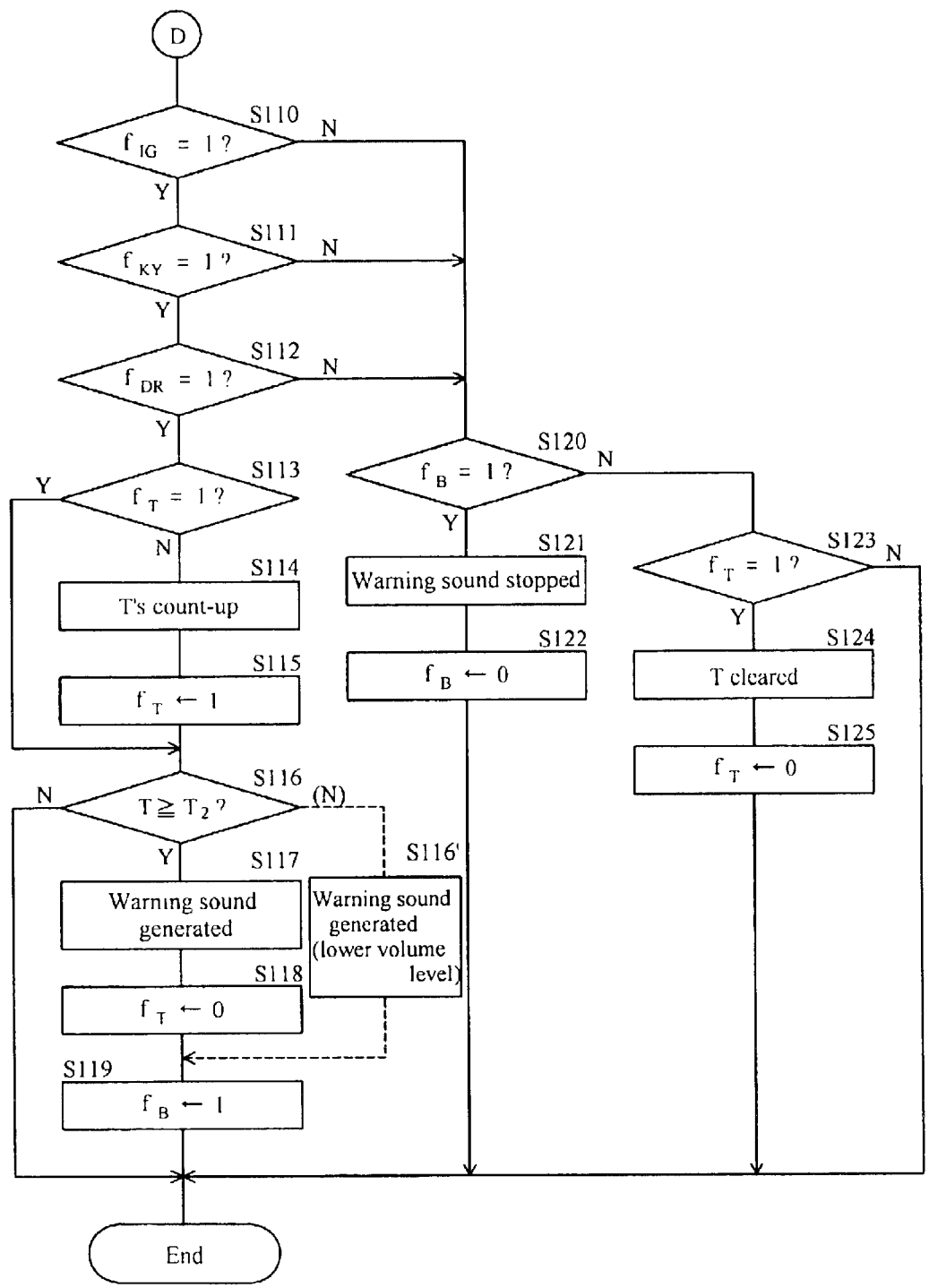
FIG. 9 is a further flow chart showing the processing operation performed by the microcomputer in the key lock-in prevention system according to the embodiment (4)

The processing operation ④ performed by the microcomputer 2C in the key lock-in prevention system IC according to the embodiment (4) is described by reference to flow charts shown in FIGS. 8 and 9. First, whether an ignition switch is in the off state or not is judged based on a signal from an ignition state detection switch 6 (Step 101). When the ignition switch is judged to be in the off state, a flag $f_{IG}$ is changed to 1 (Step 102), while when the ignition switch is judged not to be in the off state, the flag $f_{IG}$ is changed to 0 (Step 103).

Then, whether the ignition key is inserted in a key cylinder or not is judged based on a signal from a key position detection switch 4 (Step 104). When the ignition key is judged to be inserted in the key cylinder, a flag $f_{KY}$ is changed to 1 (Step 105), while when the ignition key is judged not to be inserted in the key cylinder, the flag $f_{KY}$ is changed to 0 (Step 106).

Then, whether the driver's seat side door is open or not is judged based on a signal from a door open/closed state detection switch 5 (Step 107). When the door is judged to be open, a flag $f_{DR}$ is changed to 1 (Step 108), and the operation goes to Step 110. On the other hand, when the door is judged not to be open, the flag $f_{DR}$ is changed to 0 (Step 109), and it goes to Step 110 (FIG. 9).

In Step 110, whether the flag $f_{IG}$ is 1 or not is judged. When the flag $f_{IG}$ is judged to be 1 (the ignition switch is in the off state), whether the flag $f_{KY}$ is 1 or not is judged (Step 111). When the flag $f_{KY}$ is judged to be 1 (the ignition key is inserted in the key cylinder), whether the flag $f_{DR}$ is 1 or not is judged (Step 112).

When the flag $f_{DR}$ is judged to be 1 (these three conditions, that is, the ignition switch is in the off state, the ignition key is in a state of inserted in the key cylinder and the driver's seat side door is open, are satisfied), whether a flag $f_T$ is 1 or not is judged (Step 113). Here, the flag $f_T$ is a flag showing that a below-described timer T is carrying out count-up.

When the flag $f_T$ is judged not to be 1 in Step 113, the timer T is caused to start the count-up (Step 114), the flag $f_T$ is changed to 1 (Step 115), and the operation goes to Step 116. On the other hand, when the flag $f_T$ is judged to be 1 in Step 113, the timer T has already been conducting the count-up, it bypasses Steps 114 and 115, and goes directly to Step 116.

In Step 116, whether or not the timer T is equal to or more than a time $T_2$ (e.g. 2 seconds) is judged. When the timer T is judged to be equal to or more than the time $T_2$, a warning sound generator 3 is controlled so as to generate a warning sound (Step 117), and then the flag $f_T$ is changed to 0 (Step 118) and a flag $f_B$ showing that the warning sound is being generated is changed to 1 (Step 119). On the other hand, when the timer T is judged not to be equal to or more than the time $T_2$, the processing operation ④ is ended.

On the other hand, when the flag $f_{DR}$ is judged not to be 1 (the door is closed) in Step 112, the generation of a warning sound is not required, so that the operation goes not to Step 113 but to Step 120.

In addition, when the flag $f_{IG}$ is judged to be 0 (the ignition switch is in the on state) in Step 110, or the flag $f_{KY}$ is judged to be 0 (the ignition key is not inserted in the key cylinder) in Step 111, or the flag $f_{DR}$ is judged to be 0 (the driver's seat side door is closed) in Step 112, it is not necessary to prevent key lock-in, so that it goes to Step 120.

In Step 120, whether the flag $f_B$ showing that the warning sound is being generated is 1 or not is judged. When the flag $f_B$ is judged to be 1, the warning sound generator 3 is controlled so as to stop the warning sound (Step 121), and then the flag $f_B$ is changed to 0 (Step 122).

When the flag $f_B$ is judged not to be 1 in Step 120, whether the flag $f_T$ is 1 or not is judged (Step 123). When the flag $f_T$ is judged to be 1, the timer T is cleared (Step 124), and then the flag $f_T$ is changed to 0 (Step 125). On the other hand, when the flag $f_T$ is judged not to be 1, the processing operation ④ is ended at once.

As described in the "Description of the Relevant Art", there has been a problem that a warning sound is generated when the warning is not necessary. For example, a warning sound is generated at a point of time when a driver inserted an ignition key into a key cylinder in order to start an engine without closing the driver's seat side door, leading to an unpleasant feeling given to the driver.

Using the key lock-in prevention system according to the embodiment (4), since a delay time is set before the warning of a failure to remove a key is given after these three conditions, that is, the ignition switch is in the off state, the ignition key is in a state of inserted in the key cylinder and the driver's seat side door is open, are satisfied, it is possible to prevent a warning sound from being generated only by making the ignition switch in the on state within the delay time (2 seconds) even if the driver tries to start an engine without closing the driver's seat side door.

Therefore, when the driver has forgotten to remove the ignition key, the warning of a failure to remove a key can be properly given to the driver, while when the warning is not required, it is possible to give no warning.

Here, in a key lock-in prevention system according to another embodiment, instead of 2-sec delay of the generation of the warning, the volume level of the warning sound may be lowered during the time. In that case, when the timer T is judged not to be equal to or more than the time $T_2$ in Step 116 of FIG. 9, the processing operation ④ is not ended at once, but it goes to Step 116', wherein a warning sound of a lower volume than the warning sound generated in Step 117 is generated, and then it goes to Step 119.

A key lock-in prevention system according to an embodiment (5) is described below. Here, since the construction of the key lock-in prevention system according to the embodiment (5) is similar to that of the key lock-in prevention system 1 shown in FIG. 1 except for the microcomputer 2, only a microcomputer and a key lock-in prevention system comprising the microcomputer are differently marked and the others are not described below.

Figure 10:
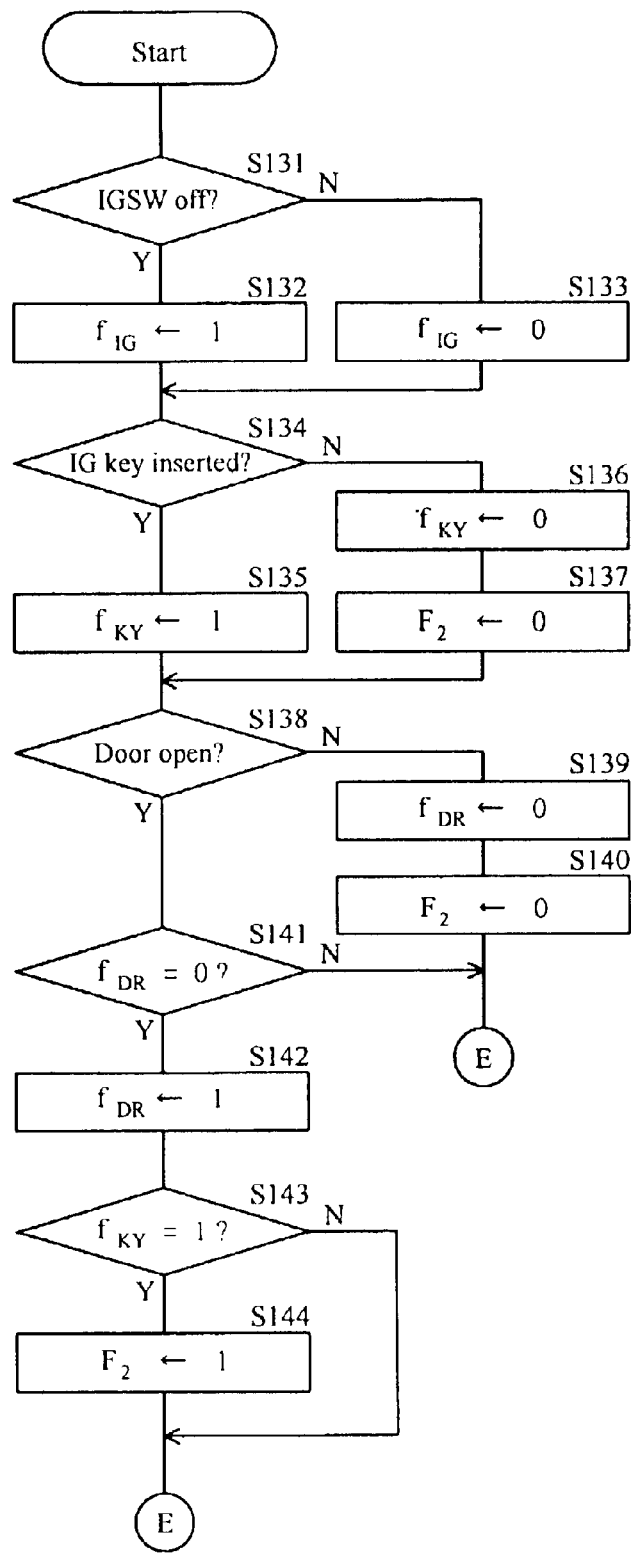
FIG. 10 is a flow chart showing a processing operation performed by a microcomputer in a key lock-in prevention system according to an embodiment (5)

The processing operation ⑤ performed by the microcomputer 2D in the key lock-in prevention system 1D according to the embodiment (5) is described by reference to flow charts shown in FIGS. 10 and 11. First, whether an ignition switch is in the off state or not is judged based on a signal from an ignition state detection switch 6 (Step 131). When the ignition switch is judged to be in the off state, a flag $f_{IG}$ is changed to 1 (Step 132), while when the ignition switch is judged not to be in the off state, the flag $f_{IG}$ is changed to 0 (Step 133).

Then, whether the ignition key is inserted in a key cylinder or not is judged based on a signal from a key position detection switch 4 (Step 134). When the ignition key is judged to be inserted in the key cylinder, a flag $f_{KY}$ is changed to 1 (Step 135) and the operation goes to Step 138. On the other hand, when the ignition key is judged not to be in the key cylinder, the flag $f_{KY}$ is changed to 0 (Step 136) and a flag $F_2$ is changed to 0 (Step 137), and it goes to Step 138. Here, the flag $F_2$ is a flag showing that the driver's seat side door was opened while the ignition key has been inserted in the key cylinder.

In Step 138, whether the driver's seat side door is open or not is judged based on a signal from a door open/closed state detection switch 5. When the door is judged to be open, whether a flag $f_{DR}$ showing that the door is open is 0 or not is judged (Step 141). When the flag $f_{DR}$ is judged to be 0, the flag $f_{DR}$ is changed to 1 (Step 142), and then it goes to Step 143.

Figure 11:
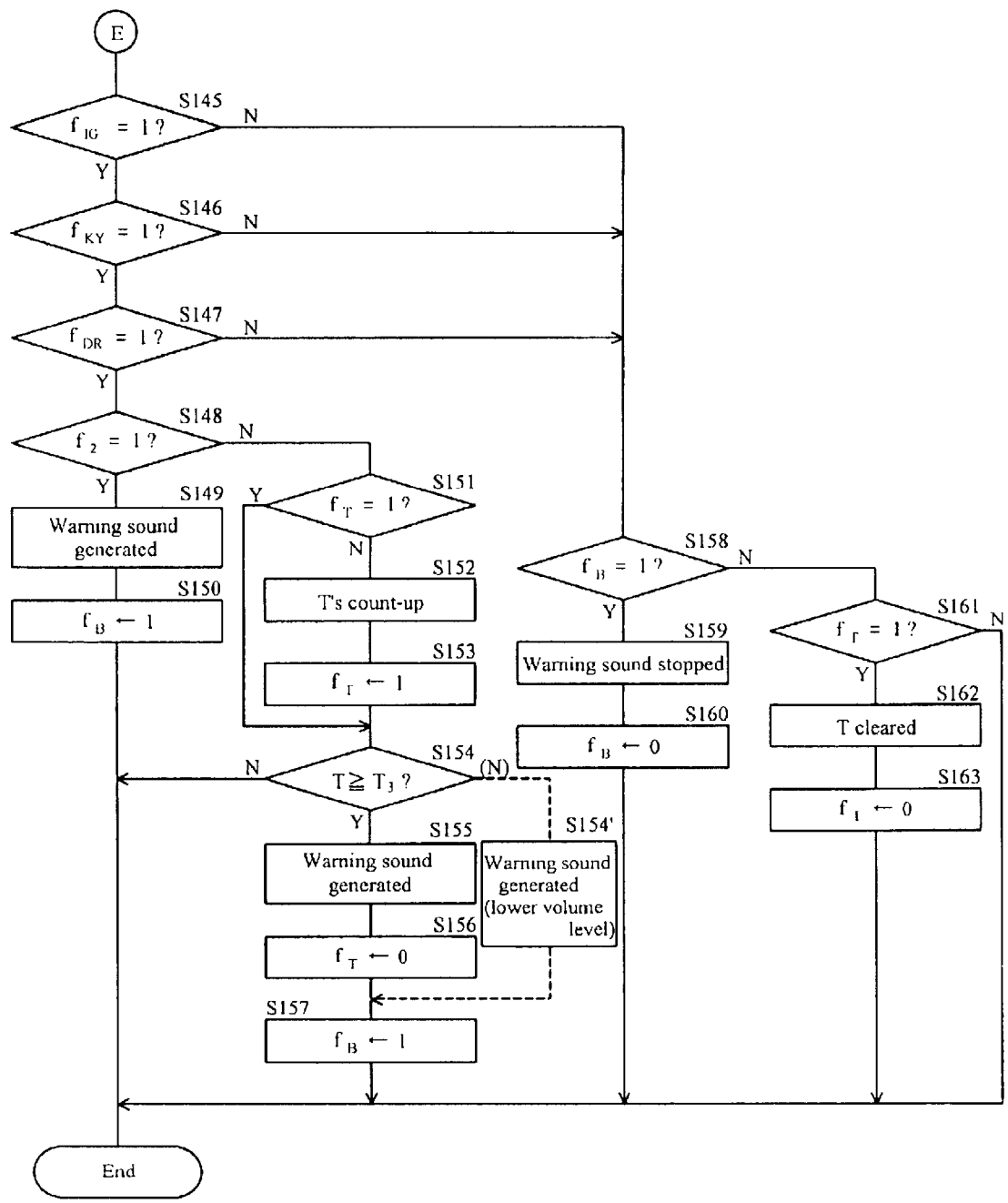
FIG. 11 is a further flow chart showing the processing operation performed by the microcomputer in the key lock-in prevention system according to the embodiment (5).

On the other hand, when the door is judged not to be open in Step 138, the flag $f_{DR}$ is changed to 0 (Step 139) and the flag $F_2$ is changed to 0 (Step 140), and then it proceeds to Step 145 (FIG. 11).

By the way, the judgment processing in Step 141 is conducted in a case where the driver's seat side door is open. Therefore, that the flag $f_{DR}$ is judged to be 0 in Step 141 means that the door was opened just now.

In Step 143, whether the flag $f_{KY}$ is 1 or not is judged. When the flag $f_{KY}$ is judged to be 1 (the ignition key is inserted in the key cylinder), that is, the ignition key had been already inserted in the key cylinder at a point of time when the driver's seat side door was opened, the flag $F_2$ is changed to 1 (Step 144), and then the operation goes to Step 145 (FIG. 11). On the other hand, when the flag $f_{KY}$ is judged not to be 1, it goes direct to Step 145.

In Step 145, whether the flag $f_{IG}$ is 1 or not is judged. When the flag $f_{IG}$ is judged to be 1 (the ignition switch is in the off state), whether the flag $f_{KY}$ is 1 or not is judged (Step 146). When the flag $f_{KY}$ is judged to be 1 (the ignition key is inserted in the key cylinder), whether the flag $f_{DR}$ is 1 or not is judged (Step 147). When the flag $f_{DR}$ is judged to be 1 (the driver's seat side door is open), whether the flag $F_2$ is 1 or not is judged (Step 148).

In Step 148, when the flag $F_2$ is judged to be 1 (the driver's seat side door was opened while the ignition key has been inserted in the key cylinder), a warning sound generator 3 is controlled so as to generate a warning sound (Step 149), and then a flag $f_B$ showing that the warning sound is being generated is changed to 1 (Step 150).

On the other hand, when the flag $F_2$ is judged not to be 1 (the driver's seat side door was not opened while the ignition key has been inserted in the key cylinder) in Step 148, whether a flag $f_T$ is 1 or not is judged (Step 151). Here, the flag $f_T$ is a flag showing that a below-described timer T is conducting count-up.

In Step 151, when the flag $f_T$ is judged not to be 1, the timer T is caused to start the count-up (Step 152), the flag $f_T$ is changed to 1 (Step 153), and the operation goes to Step 154. On the other hand, when the flag $f_T$ is judged to be 1 in Step 151, the timer T has been already conducting the count-up, so that it bypasses Steps 152 and 153, and proceeds direct to Step 154.

In Step 154, whether or not the timer T is equal to or more than a time $T_3$ (e.g. 2 seconds) is judged. When the timer T is judged to be equal to or more than the time $T_3$, the warning sound generator 3 is controlled so as to generate a warning sound (Step 155), and then the flag $f_T$ is changed to 0 (Step 156) and a flag $f_B$ showing that the warning sound is being generated is changed to 1 (Step 157). On the other hand, when the timer T is judged not to be equal to or more than the time $T_3$, the processing operation ⑤ is ended.

In addition, when the flag $f_{IG}$ is judged to be 0 (the ignition switch is in the on state) in Step 145, or the flag $f_{KY}$ is judged to be 0 (the ignition key is not inserted in the key cylinder) in Step 146, or the flag $f_{DR}$ is judged to be 0 (the driver's seat side door is closed) in Step 147, the prevention of key lock-in is not required, so that the operation goes to Step 158.

In Step 158, whether the flag $f_B$ showing that the warning sound is being generated is 1 or not is judged. When the flag $f_B$ is judged to be 1, the warning sound generator 3 is controlled so as to stop the warning sound (Step 159), and then the flag $f_B$ is changed to 0 (Step 160).

When the flag $f_B$ is judged not to be 1 in Step 158, whether the flag $f_T$ is 1 or not is judged (Step 161). When the flag $f_T$ is judged to be 1, the timer T is cleared (Step 162), and then the flag $f_T$ is changed to 0 (Step 163). On the other hand, when the flag $f_T$ is judged not to be 1, the processing operation ⑤ is ended at once.

It appears that a typical case of the occurrence of an event of a failure to remove a key is the case where a driver opens the driver's seat side door with an ignition key inserted in a key cylinder, gets out of the car with the key left as it is, and closes the door.

Using the key lock-in prevention system according to the embodiment (5), when these three conditions, that is, the ignition switch is in the off state, the ignition key is in a state of inserted in the key cylinder and the driver's seat side door is open, are satisfied, a warning sound is generated as soon as the door is opened while the ignition key is inserted in the key cylinder. But in the other cases, with a delay time set, a warning sound is generated.

Therefore, when the driver has forgotten to remove the ignition key, the warning of a failure to remove a key can be properly given to the driver, while when the warning is not required, it is possible to give no warning.

Here, in a key lock-in prevention system according to another embodiment, instead of 2-sec delay of the generation of the warning, the volume level of the warning sound may be lowered during the time. In that case, when the timer T is judged not to be equal to or more than the time $T_3$ in Step 154 of FIG. 11, the processing operation ⑤ is not ended at once, but it goes to Step 154', wherein a warning sound of a lower volume than the warning sound generated in Step 155 is generated, and then it goes to Step 157.

In the key lock-in prevention system according to any of the embodiments (1)–(5), each type of control is conducted based on signals from the key position detection switch 4, the door open/closed state detection switch 5, and the ignition state detection switch 6, but in a key lock-in prevention system according to another embodiment, an occupant detection switch to detect the existence of occupants within the car, or an occupant on the driver's seat may be arranged, and based on a signal from the occupant detection switch, when an occupant is inside the car, no warning sound may be generated. Moreover, as a warning condition, still another condition may be added.

In addition, in the key lock-in prevention systems according to the above embodiments, only the case where a warning sound is generated as a warning of a failure to remove a key is described, but it is not limited to the warning sound. Whatever can warn a driver of a failure to remove a key may be used. For example, a lamp may light up.

What is claimed is:

1. A key lock-in prevention system, having a warning means to give a warning of a failure to remove a key to a driver on condition that at least predetermined conditions are met; the predetermined conditions including an ignition key being in a state of insertion in a key cylinder and a driver's seat side door being open:

comprising a first judging means to judge whether or not the ignition key is inserted into the key cylinder while the driver's seat side door is in the open state, on the basis of a signal detected by a key position detecting means to detect whether or not the ignition key is in a state of insertion in the key cylinder and a signal detected by a door open/closed state detecting means to detect the open/closed state of the door;

wherein the warning means does not give the warning of a failure to remove a key even if the predetermined conditions are met, when the first judging means judges the ignition key to have been inserted into the key cylinder during the door's open state.

2. A key lock-in prevention system according to claim 1, wherein:

the warning of a failure to remove a key is given at a first volume level; and the warning means gives a warning at a second volume level lower than the first volume level, when the first judging means judges the ignition key to have been inserted into the key cylinder during the door's open state and the predetermined conditions are also met.

3. A key lock-in prevention system according to claim 1, comprising:

a second judging means to judge whether the ignition key is turned or not before an elapse of a prescribed time after the first judging means judges the ignition key to have been inserted into the key cylinder during the door's open state, on the basis of a signal detected by an ignition key turning detecting means to detect whether or not the ignition key is turned;

wherein the warning means gives a warning of a failure to remove a key, when the second judging means judges the ignition key not to have been turned before an elapse of the prescribed time.

4. A key lock-in prevention system according to claim 3, wherein:

the warning of a failure to remove a key is given at a first volume level; and the warning means gives a warning at a second volume level lower than the first volume level until the prescribed time elapses or the ignition key is turned, when the first judging means judges the ignition key to have been inserted into the key cylinder during the door's open state and the predetermined conditions are also met.

5. A key lock-in prevention system, having a control unit to control a warning generator for giving a warning of a failure to remove a key to a driver on condition that at least predetermined conditions are met, the predetermined conditions including an ignition key being in a state of insertion in a key cylinder and a driver's seat side door being open, comprising:

a first judging means to judge whether or not the ignition key is inserted into the key cylinder while the driver's seat side door is in the open state on the basis of a signal detected by a key position detecting means for detecting whether or not the ignition key is in a state of insertion in the key cylinder and a signal detected by a door open/closed state detecting means for detecting the open/closed state of the door;

wherein said control unit prohibits the warning generator from giving the warning of a failure to remove a key even if the predetermined conditions are met when the first judging means judges the ignition key to have been inserted into the key cylinder during the door's open state.

6. A key lock-in prevention system according to claim 5, wherein:

the warning of a failure to remove a key is an audible warning given at a first volume level; and the control unit controls the warning generator to give a warning at a second volume level lower than the first volume level when the first judging means judges the ignition key to have been inserted into the key cylinder during the door's open state and the predetermined conditions are met.

7. A key lock-in prevention system according to claim 5, further comprising:

a second judging means to judge whether the ignition key is turned or not before an elapse of a prescribed time after the first judging means judges the ignition key to have been inserted into the key cylinder during the door's open state on the basis of a signal detected by an ignition key turning detecting means for detecting whether or not the ignition key is turned;

wherein the control unit controls the warning generator to give a warning of a failure to remove a key when the second judging means judges the ignition key not to have been turned before an elapse of the prescribed time.

8. A key lock-in prevention system according to claim 7, wherein:

the warning of a failure to remove a key is an audible warning given at a first volume level; and the control unit controls the warning generator to give a warning at a second volume level lower than the first volume level until the prescribed time elapses or the ignition key is turned when the first judging means judges the ignition key to have been inserted into the key cylinder during the door's open state and the predetermined conditions are met.

9. A key lock-in prevention system, comprising:

a control unit that is responsive to a first signal indicating that an ignition key is inserted in a key cylinder and a second signal indicating that a driver's seat side door is opened to activate a warning generator to give a warning when both the first and second signals are active except when the driver's seat side door is opened before the ignition key is inserted into the key cylinder.

10. A key lock-in prevention system according to claim 9, wherein the control unit activates the warning generator, being a warning sound generator, to give the warning of a failure to remove the key.

* * * * *